S. D. WRIGHT & S. R. VANDERBECK.
DUMP CAR.
APPLICATION FILED AUG. 24, 1911.

1,187,593.

Patented June 20, 1916.
2 SHEETS—SHEET 2.

Witnesses.
J. C. Turner
C. H. Tresch

Inventor.
Samson D. Wright
Samuel R. Vanderbeck
by B. W. Brockett
Attorney.

UNITED STATES PATENT OFFICE.

SAMSON D. WRIGHT, OF CLEVELAND, OHIO, AND SAMUEL R. VANDERBECK, OF PHILADELPHIA, PENNSYLVANIA.

DUMP-CAR.

1,187,593.     Specification of Letters Patent.     Patented June 20, 1916.

Application filed August 24, 1911. Serial No. 645,747.

*To all whom it may concern:*

Be it known that we, SAMSON D. WRIGHT and SAMUEL R. VANDERBECK, citizens of the United States, residing at Cleveland, in the county of Cuyahoga and State of Ohio, and Philadelphia, in the county of Philadelphia and State of Pennsylvania, have invented certain new and useful Improvements in Dump-Cars, of which the following is a specification.

This invention relates to dump cars generally and particularly to that class of such devices used for handling sand and gravel.

More specifically the invention relates to a car comprising a suitable bed or framework mounted on wheels or trucks and supporting a hopper-shaped body which rests upon the bed or framework and is provided with pivot projections secured in the ends and extending downward therefrom and engaging pivot members which are angular on the bottom and have flanges extending up and engaging the pivot projections inside and toward the car body, thereby holding the body against endwise movement upon the frame and also forming means by which the body may be swung to dump the same. There are two pairs of pivots on each end of the car one toward each side. The angularity of the base of the pivot members causes the pivots to engage in the angle and thereby prevents the body from transverse shifting.

The invention may be further briefly summarized as consisting in the construction and combination of parts hereinafter set forth in the following description, drawings and claims.

Figure 1:
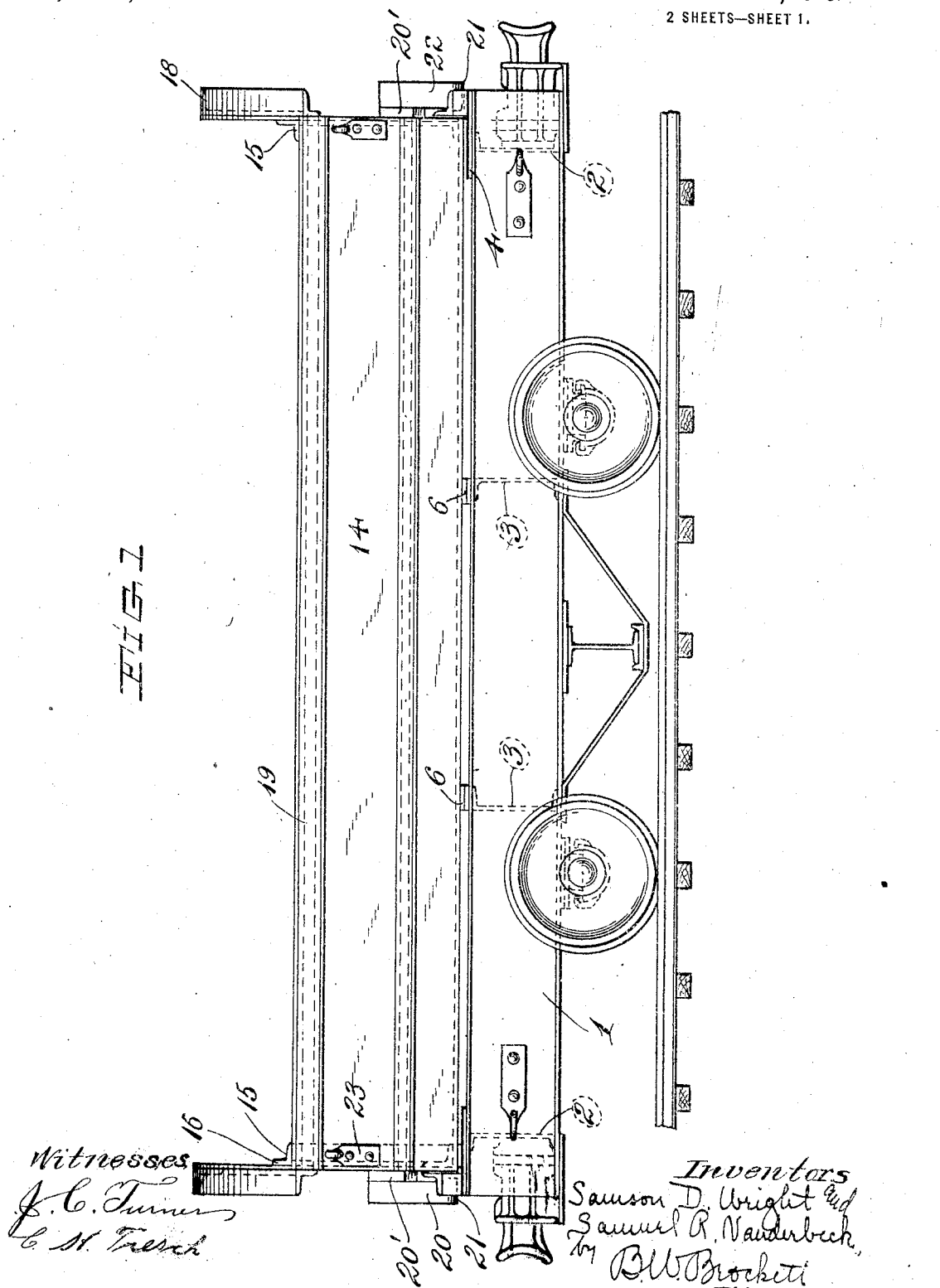
Figure 2:
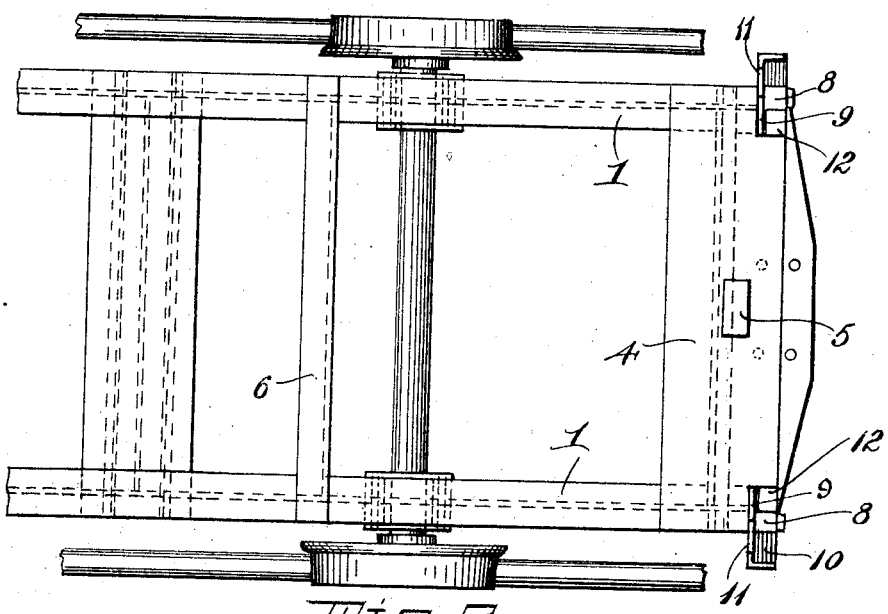

Referring to the drawings, Figure 1 is a side elevation of the car; Fig. 2 is a top plan view of a portion of the bed or framework; and Fig. 3 is an end elevation.

Figure 3:
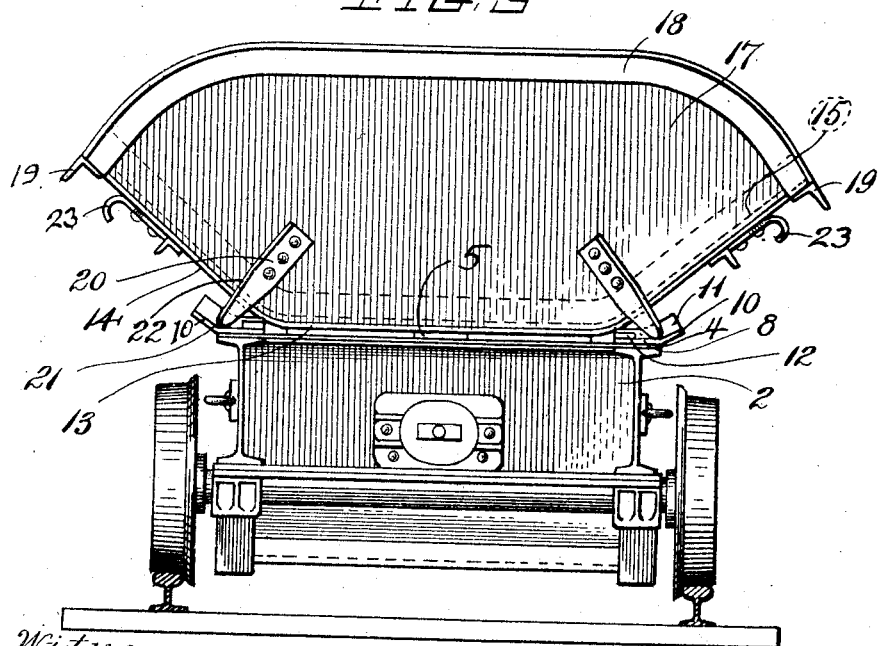

In carrying out the invention any preferred form and construction of parts may be employed so long as they possess the necessary characteristics, but we have shown one form in the drawings which is highly effective in operation, and in such embodiment 1 represents suitable side sills which extend the full length of the car, are of I shape in cross section, and are secured together by end channel members 2, shown in dotted lines in Figs. 1 and 2 and in full lines in Fig. 3. These end channels have secured to them the usual couplings which do not form any part of this invention. The side sills are further held together by intermediate transverse channel members or bolsters 3 on either side of the center, both of such bolsters 3 being shown in dotted lines in Fig. 1. Secured upon the top of the bed and near each end is a plate 4 extending across the end of the car and provided with a supporting bar 5 for supporting the body to be described. Suitable transverse supports 6 are mounted above the bolsters 3 for supporting the car body intermediate its length. Secured upon the plates 4 and near the outer corners are pivot members comprising a bottom flange 8 secured to the plate 4, an inwardly upwardly extending flange 9, an upwardly inclined flange 10 forming a continuation of the flange 8, and a vertical disposed flange 11 at the edge of the flange 10. Each of these members is in the form of angle iron bent intermediate its length to form an angle. Near the inner ends of the portion 8 are stops 12 for a purpose to be described. There is one of these pivot members at each corner of the car and their object will be later described.

Mounted upon the supporting blocks 5 and the transverse supporting bars 6 is the body which consists of a suitable bottom 13 preferably flat and having upwardly extending and outwardly inclined sides 14, all of such parts being as a whole secured to end angle strips 15 which are bent to conform to the configuration of the bottom. These angle strips 15 have upwardly extending flanges 16 to which the ends 17 of the body are secured. Suitable reinforcing angle strips 18 may be secured to the upper edges of the ends, and suitable reinforcing strips 19 may be secured to the upper edges of the sides.

Spaced from the ends of the car by blocks 20' and secured thereto are suitable pivots each comprising a main flat portion 20 provided with a rounded nose portion 21 adapted to extend outwardly and downwardly from the end of the car and to engage approximately in the angle of the pivot supporting members. The main portion 20 is still further provided with a flange 22 extending along the edge of such portion and to a point near the curved nose or outer end of the pivot. Upon each side of the car and under the edge strips 19 are suitable hooks 23 which may be engaged by any suitable hoisting mechanism utilized in tilting the car.

In operation the car normally rests upon the supporting bars 5 and 6 and is held against endwise movement by reason of the ends of the body with the pivots being mounted between or inside of the flanges 9 of the pivot members so that the pivots engaging the flanges at the ends and hold the body. The body is held against transverse movement by means of the pivots engaging the stops 12 on the one hand and the inclined flanges 10 on the other. In this way the body is held by reason of its weight against endwise and transverse movements. When the car is to be tilted or dumped suitable hoisting mechanism is connected to the hooks 13 on the side opposite to which the car is to be dumped and the body is tilted, the body turning upon the pivots which engage in the angle of the pivot members on the side of the car corresponding to the one upon which the car is to be dumped. When the car reaches complete dumping position the flanges 22 engage the flanges 10 and prevent the body from being tilted beyond the proper point, this point being one which is not the center of gravity of the car body so that upon the release of the hoisting mechanism the car body will have a tendency to assume normal position upon the frame or bed of its own weight.

Having described our invention, we claim:—

1. In a dump car, a bed, supporting wheels therefor, a pair of pivot members at each edge of the bed one near each end of the bed, flanges carried by said pivot members, a body resting upon the bed and provided with pivots projecting from the body and engaging the pivot members and adapted to engage the flanges and prevent endwise movement of the body.

2. In a dump car, a bed, supporting wheels therefor, a pair of pivot members on each side of the car and comprising a base portion, an upwardly and outwardly extending flange, and an edge flange, and a car body having pivots secured to the ends thereof and extending beyond the bottom of the car and engaging over the edge flange.

3. In a dump car, a frame, suitable supporting wheels therefor, pivot engaging members carried by the frame near the sides thereof and forming pivot sockets, a car body having a substantially flat bottom within points which are inside of the pivot members and upwardly and outwardly inclined sides extending over the pivot members, and pivots projecting from the inclined sides and adapted to engage in the sockets formed by the pivot members when dumping the car body.

4. In a dump car, a frame, suitable supporting wheels therefor, a pivot member arranged near each side of the frame forming a pivot socket, a car body having a flat bottom engaging the frame and arranged within the pivot members inclined side extending upwardly and outwardly above the pivot members, and downwardly and outwardly extending pivots extending from the body for engaging said sockets upon the dumping of the body.

5. In a dump car, a frame, suitable supporting wheels therefor, pivot members secured upon said frame, and having upwardly and outwardly extending portions, a car body having a flat bottom within points corresponding to the sides of the frame, and upwardly and outwardly extending sides forming a continuation of the bottom, and pivots secured to the end of the car and extending diagonally therefrom and engaging the pivot members within the upwardly and outwardly extending portions.

6. In a dump car, a frame, and supporting wheels on the outside of said frame, a pair of pivot members at each side of the car and each having an upwardly inclined portion extending beyond the car with a flange on one edge of said portion, a car body having a flat bottom of less width than the frame, and diagonally disposed pivots extending from the ends of the car beyond the flat portion of the bottom and each engaging in the angles of the corresponding pivot member, each of said pivots having a flange for engaging the extension of the pivot member.

In testimony whereof we affix our signatures in presence of two witnesses as follows:

SAMSON D. WRIGHT.
SAMUEL R. VANDERBECK.

Wright's witnesses:
C. H. TRESCH,
WM. EDWIN BROOKS.

Vanderbeck's witnesses:
GEO. H. VANDERBECK,
T. FRANKLIN HENDERSON.